3,148,071
PROCESS FOR PREPARING FRANKFURTERS
Jerome A. Meusel and Ralph A. Brunn, Baltimore, Md., assignors to The Baltimore Spice Company, Baltimore, Md., a corporation of Maryland
No Drawing. Filed Nov. 28, 1962, Ser. No. 240,719
1 Claim. (Cl. 99—109)

This invention relates to toasted or tempered mustard and similar spices of the Brassica family, and more particularly to a desirable modification of the taste and physical properties of such spices. The invention also relates to the heat treating process whereby such tempered spice is prepared, and to meat products containing the modified spice.

The addition of spices to various types of foods, and especially to comminuted or emulsified meat products such as frankfurters, bologna sausages, meat loaves, etc., is well known and practiced principally for the purpose of enhancing the flavor of the products, yet it has also been recognized that some of these spices tend to enhance the physical properties of the meat products or sausages, especially their peelability, cohesion and moisture retention. The addition of mustard to sausage type products is particularly desirable since the natural mucilaginous materials of the seed serve as parting agents tending to facilitate the peeling of frankfurters or sausages that have been processed in casings. Mustard seed also contains protein substances capable of absorbing material tending to form "jelly pockets" and other voids that commonly occur in heat processed meat products and make such products poor in appearance.

To take full advantage of these physical properties of mustard, the whole or ground mustard should be incorporated in the comminuted meat in concentrations of about two pounds per 100 pounds of meat. However, the amount of mustard seed actually usable has been limited to relatively low concentrations because of the pronounced biting flavor it imparts. Thus, mustard seed, preferably ground, is most frequently used at rates of up to four ounces, or, in the case of very mild grades, up to about one and one-half pounds per 100 pounds of meat product. Beyond these low limits, however, the "hot," biting flavor of mustard becomes too pronounced and is objectionable to most consumers.

It has now been discovered that the flavor of mustard seed can be tempered and favorably modified without impairing its desirable physical properties. More specifically, it has been discovered that proper heat treatment of mustard seed can be used to convert its sharp mustard flavor to a mild, pleasing nutty flavor, without impairing its ability to serve as a parting agent and absorbent. Moreover, such heat treatment of mustard seed has the important advantage that the seed become more friable and relatively easy to grind and sieve. By contrast, ordinary whole mustard seed is difficult to grind at high speeds and the resulting ground mustard blinds the screens very rapidly.

It is known that ordinary mustard seet has a pleasant flavor with little or no pungency or "bite" as long as it is dry. It is only after the seed, whole or ground, is brought into contact with moisture that the characteristic sharp bite of mustard develops, thereby imposing a limit on the concentration in which it can be used in meat products. Mustard seed ordinarily contains about 27–38% of fixed oil and small amounts of a soluble ferment or enzyme known as myrosin or myrosinate, as well as some sinapin sulfocyanate and a glucoside, namely, sinigrin or potassium myronate in the case of black mustard (*Sinapis nigra*), and sinalbin in the case of white yellow mustard (*Sinapis alba*). Sinigrin upon hydrolysis produces a volatile essential oil, allyl isothiocyanate, which is the bite of black mustard. Sinalbin, similarly, produces a sulfur-containing essential oil which is said to contain acrinyl isothiocyanate or p-oxybenzyl isothiocyanate. It should be noted that the fatty oil obtained from whole, dry mustard seed by pressing does not contain any of the pungent sulfur compounds but these form from the sinigrin or sinalbin, which remain in the solid press cake and are non-volatile. The maximum concentration of mustard that can normally be used is principally determined by the total amount of the pungent essential oil found therein, and this amount typically may range from about 0.5% in the case of mild mustard grades to about 1.2% or even 2% in the case of very "hot" grades based on the total weight of the seed. Depending on specific flavor preferred, the maximum usage level has heretofore generally ranged between about four ounces and one and a half pounds per 100 pounds of meat product in the case of mild mustards, and below four ounces per 100 pounds of product in the case of the very "hot" mustards.

The hydrolysis reactions of the two glucosides, sinigrin and sinalbin, are as follows:

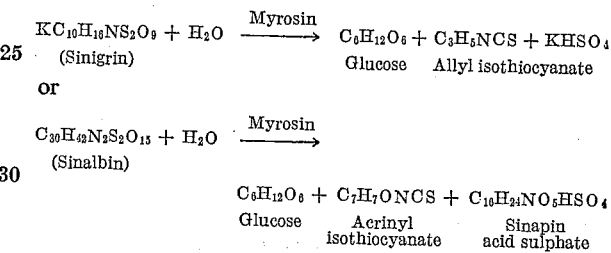

Though the glucosides themselves do not appear to be affected by heat at the temperatures employed, it has now been found that the described enzymatic hydrolytic reactions do not take place, and therefore the pungent isothiocyanate compounds are not formed, when mustard seed is heated to a temperature in excess of about 70° C. before the seed is allowed to come in contact with water. Though the exact nature of the change is not known with certainty, and it is not intended that this invention should be in any way restricted to a particular chemical mechanism, it is believed that the heat treatment prevents the eventual hydrolysis of the glucosides by destroying the enzyme, myrosin, that is required for the hydrolysis to take place.

More specifically, it has been found that heating mustard seed to a temperature above 70° C. and below the charring point of the seed, and preferably in the range of from about 90° to 180° C., the seed being either whole or ground or in the form of pressed expeller cake, rapidly destroys the propensity of the seed to develop the characteristic sharp mustard flavor without adversely affecting the desirable physical properties of the mustard. For instance, heating the mustard for about one to ten minutes at about 110° to 180° C. is usually sufficient for destroying the pungency developing mechanism of the seed, i.e., the seed thus treated produces less than about 0.1 of the pungent essential oil on contact with water. Of course, the optimum time of treatment depends somewhat on the average temperature of the treatment and the particular apparaus used. At temperatures below 110° C. treating times longer than 10 minutes, and as long as 30 minutes or more, may be required. To develop the preferred nutty flavor, it is usually desirable to use as high a treating temperature for as short a period of time as will destroy the pungency forming mechanism. The product thus obtained has an attractive flavor resembling that of toasted nuts, and this flavor is pleasingly compatible with meat and other food products in which the mustard is used.

Heating the mustard seed can be accomplished in several ways and may be applied either to the whole seed, to ground seed, or to expeller cake or flake. However, since the heat treatment increases the friability of the seed, it is particularly advantageous to heat treat the whole seed before it is ground. For instance, the mustard may be immersed for an appropriate time in an oil bath maintained at the proper temperature, whereupon the hot oil is readily separated from the mustard by draining or centrifuging. Any suitable oil may be used for this purpose, e.g., vegetable oils such as corn oil or cottonseed oil, hydrogenated vegetable oils such as Crisco, or highly refined mineral oils such as Nujol. Of course, the oil used should be non-toxic and substantially stable at the treating temperature employed. Alternately, the mustard seed can be subjected to a current of superheated air or steam of the proper temperature. Still another method involves passing the seed over an appropriately heated surface of metal, glass or similar material while agitating or moving the seed until most of it is brought to the desired temperature and the required tempering thereof is effected. It is also possible to pass the seed through, or in close proximity to, an open flame or in close proximity to electric heating elements or to infrared lamps. It will be understood, of course, that the heat source itself may be at a temperature considerably higher than that to which the seed is to be brought but the actual temperature of the seed should in such cases be monitored with some care, as by periodic removal of seed samples from the process and immediate determination of the temperature of such removed samples.

The advantages of this invention are further illustrated by the following examples. All percentages and proportions are expressed herein on a weight basis unless otherwise indicated.

Example 1

Yellow mustard seed, characterized by its ability to develop about 0.6% volatile oil calculated as allyl isothiocyanate, was subjected to heat treatment by spreading the hole seed in aluminum pans in layers about ½" thick. The pans were then put into an ordinary thermostatically controlled, electrically heated oven when the latter reached the temperature of 110° C., and heating of the oven was continued. A glass stem thermometer was laid in one of the pans to check the temperature during the heating process. After the seed had attained a temperature of 140° C., this temperature was maintained for three minutes. At the end of this time the seed was removed from the oven and allowed to air cool.

The treated seed as well as the same mustard seed which had not been treated was then ground in a Weber Laboratory hammer mill so that 100% passed a U.S. Standard No. 18 screen. A five gram sample of the ground, treated seed was placed in a 200 ml. flask and 100 ml. of water was added. The flask was stoppered tightly and the mustard allowed to macerate for two hours at 37° C. The macerated mustard and water was then transferred to a distilling flask and 20 ml. of ethyl alcohol was added. 60 ml. of the mixture was distilled into a 100 ml. volumetric flask containing 10 ml. of ammonium hydroxide, with the end of the condenser dipping below the surface of the ammonium hydroxide. Then 20 ml. of 0.1 N silver nitrate was added to the distillate and let stand overnight. The resulting silver sulfide was agglomerated by heating to boiling on a boiling water bath. Next, the flask was cooled, made up to 100 ml. with distilled water and filtered. 50 ml. of the filtrate was acidified with 5 ml. of nitric acid and titrated with 0.1 N ammonium thiocyanate using 5 ml. of 10% ferric ammonium sulphate (FeNH$_4$(SO$_4$)$_2$.12H$_2$O), as an indicator.

A five gram sample of the ground, untreated seed was analyzed in the same manner. The results were as follows:

|  | Ml. 0.1 Normal NH$_4$SCN required | Percent Volatile Oil |
| --- | --- | --- |
| Treated mustard | 19.5 | 0.05 |
| Untreated mustard | 14.0 | 0.60 |

The volatile oil content was calculated on the usual basis that 1 ml. of 0.1 N AgNO$_3$ is equivalent to 0.004956 gram of allyl isothiocyanate. The comparison shows that the heat treated seed developed considerably less than 10% of the pungent essential oil obtained in the case of the untreated seed.

Since the macerated mustard was found totally lacking in the characteristic pungency of flavor or aroma of mustard, it is apparent that in the described analysis of the treated seed, the silver sulfide had been formed by other sulphur bearing compounds naturally present in the mustard and that no allyl isothiocyanate or acrinyl isothiocyanate had been formed because myrosin had been completely destroyed.

Example 2

When ground mustard seed is used as part of the seasoning in meat formulas, the desired degree of pungency is usually obtained on a level of from one to five ounces to each 100 pounds of product. Typical formulas for seasonings containing mustard are as follows:

|  | White Pepper, Ounces | Coriander, Ounces | Mustard, Ounces | Nutmeg, Ounces | Red Pepper, Ounces | Caraway, Ounces | Cloves, Ounces | Ginger, Ounces |
| --- | --- | --- | --- | --- | --- | --- | --- | --- |
| Potted Meat Sandwich Spread | 5 | 0 | 5 | 1½ | 1½ | 0 | 0 | 0 |
| Frankfurters | 5 | 3 | 1 | 2 | 0 | 0 | 0 | 0 |
| Braunschweiger | 6 | 2 | 3 | 0 | 0 | 1 | ½ | 0 |
| Thuringer | 6 | 0 | 1 | 0 | 0 | 0 | 0 | 0 |
| Cerevelat | 8 | 0 | 2 | 0 | 0 | 0 | 0 | 0 |
| Lebanon | 6½ | 0 | 1 | 1¼ | 0 | 0 | 0 | 1¼ |

This also serves to illustrate that the volatile oil of mustard is an extremely potent flavoring. In the foregoing seasoning illustrations five ounces of mustard containing 0.6% volatile oil would give only 20 parts per million of volatile oil in the finished product.

As much as eight ounces of mustard having a volatile oil content of 0.6% has sometimes been used in products, though this amount tends to produce a sharp flavor above the normally desirable flavor level. If the mustard contains about 1.2% or more of the volatile oil, the maximum usage level is advisably kept below about four ounces per 100 pounds of product. However, except for the flavor limitation, the use of much higher quantities of mustard is desirable because of the physical benefits that mustard can produce. The present invention produces a tempered mustard which can be used at the desired higher levels without producing any objectionably sharp flavor. Indeed, if used in the preferred quantities, the mustard tempered in accordance with this invention imparts to meat products a delicate nutty flavor of its own.

To demonstrate the moisture absorption properties of treated and untreated ground mustard, the following tests were conducted. One hundred grams samples of ordinary ground mustard, on the one hand, and of ground mustard heat treated as in Example 1 hereof, on the other hand, were mixed with varying amounts of water, allowed to soak for five minutes, placed upon a 90 mesh screen inclined at an angle of 45°, and observed to determine if any water was released and dripped from the screen. This series of tests indicates the amount of moisture that ground mustard could hold in a product similar, for example, to a frankfurter emulsion. The results were as follows:

| Water Added per 100 grams of mustard | Water Released | |
|---|---|---|
| | Treated Mustard | Untreated Mustard |
| 50 ml | None | None |
| 100 ml | None | None |
| 150 ml | None | Released |
| 200 ml | Released | Released |

The results indicate that there is a definite increase in the absorption ability of the treated mustard over the untreated mustard.

In regard to making sausage products processed in casings, it is a well-known fact that any substance capable of holding water, such as gums and mucilaginous materials, acts as a "parting agent" or lubricant, thus enabling the casings to be stripped off readily without tearing the meat. Treated mustard can be added in concentrations sufficiently high to accomplish this, e.g., about 2 to 10% or more, and preferably about 3 to 7% of the meat product, which concentrations of the treated mustard are equivalent to less than about 50 parts per million of pungent essential oil based on the weight of the meat product, whereas untreated mustard at the same concentrations would render the product inedible because of excessive "biting" flavor.

*Example 3*

As indicated above, heat treated mustard seed also has the advantage that it is much more friable, and therefore easier to grind and sieve, than untreated seed. In addition to loss of moisture from the seed, a certain degree of polymerization of the fixed oil apparently also takes place during the heat treatment, and this makes it less sticky and more brittle. This is illustrated by the following data.

One pound of untreated mustard seed was ground through a Weber Laboratory hammer mill with a #50 slotted screen. For comparison, one pound of mustard seed treated as in Example 1 was ground through the screen in the same way. The samples were subjected to particle size analysis. The results were as follows:

| | Treated, percent | Untreated, percent |
|---|---|---|
| Retained on U.S. Standard No. 28 screen | 11.6 | 25.6 |
| Retained on U.S. No. 38 screen | 37.4 | 32.8 |
| Retained on U.S. No. 60 screen | 17.7 | 19.3 |
| Retained on U.S. Standard No. 90 screen | 14.0 | 9.0 |
| Passing U.S. Standard No. 90 screen | 19.3 | 13.3 |

It can be seen that more fine particles were obtained from the treated seed than from the untreated seed, indicating that the treated seed was more friable and much easier to grind.

While the above examples illustrate specific embodiments and advantages of the novel heat treated seed and of its preparation and uses, it will be understood that these examples are not limiting. On the contrary, various modifications and variations thereof are possible without departing from the scope of this invention or of the appended claims. Thus, while the invention is of particular importance in connection with mustard seed, similar advantages can be obtained by applying the described heat tempering process to rapeseed (*Brassica napus* and *Brassica campestris*) or still other species of the Brassicaceae or Cruciferae family. It will also be understood that any reference to "dry seed" and "dry mustard seed" herein includes fresh seed containing the natural moisture as well as seed, whole, ground or pressed, which has been subjected to drying at temperatures up to about 50° C. However, as used herein, these quoted terms do not include seed that had been exposed to water under conditions such that the sulfur-containing glucoside of the seed was hydrolyzed to the corresponding pungent essential oil.

The meat in which the tempered seed of this invention may be incorporated, may be any type of meat conventionally used in the production of sausages, such as lean or fat beef or pork, etc., which, additionally, may include any of the various customary additional ingredients such as nitrite salts or other curing agents, phosphate mixtures or other anti-coagulants, color preservatives, spices, as well as binding agents such as milk powder, casein, skin powder, potato powder and the like. Of course, one of the advantages of the present invention is that the tempered mustard seed can be used in such high proportions that other binding agents need not be employed. It is also within the scope of this invention to use the novel tempered mustard in conjunction with or in addition to the conventional low amounts of ordinary, untreated mustard.

We claim:

A process for preparing frankfurters of improved peelability and moisture retention from a comminuted meat emulsion, which process comprises incorporating in said meat emulsion 2 to 10% of non-pungent ground mustard prepared by treatment of mustard seed which in its untreated form produces a pungent essential oil by enzymatic hydrolysis of a glucoside contained in said seed, said treatment consisting essentially in heating dry whole mustard seed at a temperature between 110° C. and 180° C. for a period within the range between 1 and 10 minutes, whereby the ability of the mustard seed to form the pungent essential oil is destroyed so that less than about 0.1% of the pungent oil is produced on contact of the heat treated seed with water, and grinding the heat treated seed.

References Cited in the file of this patent

UNITED STATES PATENTS

| 2,333,505 | Allen | Nov. 2, 1943 |
| 3,008,832 | Gorsica | Nov. 14, 1961 |
| 3,106,469 | Mustakos et al. | Oct. 8, 1963 |

FOREIGN PATENTS

| 9,620 | Great Britain | of 1887 |
| 412,967 | Great Britain | July 6, 1934 |